United States Patent
Hamad et al.

(10) Patent No.: US 10,280,877 B2
(45) Date of Patent: May 7, 2019

(54) APPARATUS AND METHOD FOR OXY-COMBUSTION OF FUELS IN INTERNAL COMBUSTION ENGINES

(71) Applicant: Saudi Arabian Oil Company, Dhahran (SA)

(72) Inventors: Esam Zaki Hamad, Dhahran (SA); Wajdi Issam Al-Sadat, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 21 days.

(21) Appl. No.: 15/343,626

(22) Filed: Nov. 4, 2016

(65) Prior Publication Data

US 2017/0074213 A1    Mar. 16, 2017

Related U.S. Application Data

(63) Continuation of application No. 13/804,291, filed on Mar. 14, 2013, now Pat. No. 9,488,100.

(Continued)

(51) Int. Cl.
*F02M 25/12* (2006.01)
*F02B 77/00* (2006.01)
(Continued)

(52) U.S. Cl.
CPC ......... *F02M 25/12* (2013.01); *B01D 53/0462* (2013.01); *B01D 53/0476* (2013.01);
(Continued)

(58) Field of Classification Search
CPC .. F02M 25/12; F02M 26/37; F02M 35/10242; F02M 26/04; F02M 26/35;
(Continued)

(56) References Cited

U.S. PATENT DOCUMENTS 3,828,552 A * 8/1974 Nishiguchi ........... F01N 3/0857
123/434
4,781,907 A * 11/1988 McNeill ................. B01D 53/22
252/372

(Continued)

*Primary Examiner* — Joseph J Dallo
(74) *Attorney, Agent, or Firm* — Abelman, Frayne & Schwab

(57) ABSTRACT

A method and apparatus for the oxy-combustion of fuel in an internal combustion engine (ICE) used to power a vehicle includes one or more air separation devices that separate oxygen from the atmospheric air to mix with the fuel and return the nitrogen to the atmosphere and converts the free energy available in the form of waste heat from the engine exhaust gas stream and coolant system on board the vehicle into electrical and/or mechanical energy, which energy is used to separate oxygen from air to eliminate or significantly reduce the volume of nitrogen entering the ICE's combustion chamber, and thereby reduce $NO_x$ pollutants released into the atmosphere and increase the concentration of $CO_2$ in the engine exhaust stream for capture using an integrated system to compress and increase the density of the captured $CO_2$ for temporary on-board storage until it is discharged at a recovery station, e.g., during vehicle refueling.

13 Claims, 6 Drawing Sheets

Related U.S. Application Data

(60) Provisional application No. 61/614,062, filed on Mar. 22, 2012.

(51) Int. Cl.

| | | |
|---|---|---|
| *B01D 53/22* | (2006.01) | |
| *F02B 47/10* | (2006.01) | |
| *C01B 13/02* | (2006.01) | |
| *F02M 26/04* | (2016.01) | |
| *F02M 26/35* | (2016.01) | |
| *F02M 26/37* | (2016.01) | |
| *B01D 53/04* | (2006.01) | |
| *B01D 53/047* | (2006.01) | |
| *F02M 35/10* | (2006.01) | |
| *F02B 77/02* | (2006.01) | |
| *F02B 37/00* | (2006.01) | |

(52) U.S. Cl.
CPC .......... *B01D 53/22* (2013.01); *C01B 13/0251* (2013.01); *C01B 13/0255* (2013.01); *C01B 13/0259* (2013.01); *F02B 47/10* (2013.01); *F02B 77/00* (2013.01); *F02M 26/04* (2016.02); *F02M 26/35* (2016.02); *F02M 26/37* (2016.02); *F02M 35/10242* (2013.01); *F02M 35/10373* (2013.01); *B01D 53/047* (2013.01); *B01D 2253/1124* (2013.01); *B01D 2256/10* (2013.01); *B01D 2256/12* (2013.01); *B01D 2257/102* (2013.01); *B01D 2257/104* (2013.01); *B01D 2257/80* (2013.01); *B01D 2259/402* (2013.01); *B01D 2259/45* (2013.01); *C01B 2210/0046* (2013.01); *C01B 2210/0051* (2013.01); *C01B 2210/0075* (2013.01); *F02B 37/00* (2013.01); *F02B 77/02* (2013.01); *Y02C 10/08* (2013.01); *Y02C 10/10* (2013.01); *Y02P 20/129* (2015.11); *Y02P 20/152* (2015.11); *Y02P 30/30* (2015.11); *Y02T 10/121* (2013.01); *Y02T 10/16* (2013.01)

(58) Field of Classification Search
CPC .......... F02M 35/10373; C01B 13/0255; C01B 13/0251; C01B 13/0259; B01D 53/0462; B01D 53/0476; B01D 53/22; F02B 47/10; F02B 77/00

See application file for complete search history.

(56) References Cited

U.S. PATENT DOCUMENTS

| | | | | | |
|---|---|---|---|---|---|
| 5,021,137 | A * | 6/1991 | Joshi | ............ | C25B 1/02 204/242 |
| 5,051,113 | A * | 9/1991 | Nemser | ............ | B01D 53/22 123/26 |
| 5,302,258 | A * | 4/1994 | Renlund | ............ | B01D 53/326 204/260 |
| 5,441,610 | A * | 8/1995 | Renlund | ............ | B01D 53/326 204/228.6 |
| 5,516,359 | A * | 5/1996 | Kang | ............ | B01D 53/22 60/39.5 |
| 5,636,619 | A * | 6/1997 | Poola | ............ | B01D 53/22 123/585 |
| 5,680,764 | A * | 10/1997 | Viteri | ............ | F01K 21/047 60/39.6 |
| 5,718,194 | A * | 2/1998 | Binion | ............ | F02B 47/02 123/25 C |
| 5,779,879 | A * | 7/1998 | Dieterich | ............ | B01D 53/22 204/277 |
| 5,960,777 | A * | 10/1999 | Nemser | ............ | B01D 53/228 123/26 |
| 6,055,808 | A * | 5/2000 | Poola | ............ | F02B 33/44 123/26 |
| 6,170,264 | B1 * | 1/2001 | Viteri | ............ | B60K 6/24 60/671 |
| 6,173,567 | B1 * | 1/2001 | Poola | ............ | B01D 53/22 123/26 |
| 6,293,084 | B1 * | 9/2001 | Drnevich | ............ | B01D 53/22 60/39.17 |
| 6,352,068 | B1 * | 3/2002 | Jacobsen | ............ | F01N 1/14 123/585 |
| 6,681,752 | B1 * | 1/2004 | Kreikemeier | ............ | F02D 41/1454 123/683 |
| 6,725,824 | B2 * | 4/2004 | Donauer | ............ | F02B 3/06 123/255 |
| 7,464,540 | B2 * | 12/2008 | Easley, Jr. | ............ | F01N 3/0231 123/567 |
| 7,465,337 | B2 * | 12/2008 | Gaertner | ............ | F02M 25/12 123/198 E |
| 7,891,186 | B1 * | 2/2011 | Primlani | ............ | F01K 23/065 60/597 |
| 7,927,568 | B2 * | 4/2011 | Fan | ............ | B01D 53/002 423/220 |
| 2001/0050075 | A1 * | 12/2001 | Lerner | ............ | F02M 29/04 123/593 |
| 2002/0100836 | A1 * | 8/2002 | Hunt | ............ | B63G 8/08 244/50 |
| 2003/0024513 | A1 * | 2/2003 | Weber | ............ | B01D 53/22 123/585 |
| 2003/0101726 | A1 * | 6/2003 | Marin | ............ | F22B 31/00 60/677 |
| 2004/0055585 | A1 * | 3/2004 | Smolarek | ............ | F01N 3/0807 123/585 |
| 2004/0055586 | A1 * | 3/2004 | Botti | ............ | B60K 6/24 123/585 |
| 2004/0128975 | A1 * | 7/2004 | Viteri | ............ | F01K 25/005 60/39.55 |
| 2005/0199231 | A1 * | 9/2005 | Heider | ............ | F02M 25/12 123/585 |
| 2005/0204923 | A1 * | 9/2005 | Nakamura | ............ | A61M 16/10 96/128 |
| 2005/0235650 | A1 * | 10/2005 | Griffin | ............ | F02C 6/18 60/780 |
| 2006/0130819 | A1 * | 6/2006 | Beckmann | ............ | B01D 53/22 123/585 |
| 2006/0180022 | A1 * | 8/2006 | Holmes | ............ | B01D 53/22 95/45 |
| 2006/0225692 | A1 * | 10/2006 | Lindner | ............ | F02M 27/02 123/253 |
| 2007/0220896 | A1 * | 9/2007 | Varatharajan | ............ | F02C 1/002 60/772 |
| 2008/0115773 | A1 * | 5/2008 | Gaur | ............ | F02M 23/00 123/585 |
| 2008/0169449 | A1 * | 7/2008 | Mundschau | ............ | B01D 69/141 252/373 |
| 2008/0236117 | A1 * | 10/2008 | Zhang | ............ | B01D 53/62 55/418 |
| 2009/0071434 | A1 * | 3/2009 | MacMillan | ............ | F02B 77/02 123/193.6 |
| 2009/0120056 | A1 * | 5/2009 | Friedberger | ............ | F02K 9/62 60/203.1 |
| 2009/0139497 | A1 * | 6/2009 | Shi | ............ | B01D 53/323 123/539 |
| 2009/0159057 | A1 * | 6/2009 | Pursifull | ............ | F02M 63/0225 123/575 |
| 2009/0173322 | A1 * | 7/2009 | Figl | ............ | F01L 1/0532 123/670 |
| 2010/0175639 | A1 * | 7/2010 | Al-Dawood | ............ | B01D 53/005 123/3 |
| 2010/0229841 | A1 * | 9/2010 | Nakayama | ............ | F02M 26/15 123/568.11 |
| 2010/0263377 | A1 * | 10/2010 | Meulenberg | ............ | B01D 53/22 60/645 |
| 2010/0300063 | A1 * | 12/2010 | Palmer | ............ | F23D 1/00 60/39.461 |

(56) References Cited

U.S. PATENT DOCUMENTS

| | | | | |
|---|---|---|---|---|
| 2011/0061385 A1* | 3/2011 | Baxter | ................... | F01K 13/00 |
| | | | | 60/649 |
| 2011/0179799 A1* | 7/2011 | Allam | ................... | F23M 5/085 |
| | | | | 60/772 |
| 2013/0145748 A1* | 6/2013 | Shimizu | ............... | F02M 25/032 |
| | | | | 60/274 |

* cited by examiner

APPARATUS AND METHOD FOR OXY-COMBUSTION OF FUELS IN INTERNAL COMBUSTION ENGINES

RELATED APPLICATIONS

This application is a continuation application of U.S. patent application Ser. No. 13/804,291 filed on Mar. 14, 2013, which claims the benefit of priority of 35 USC § 119(e) to U.S. Provisional Patent Application No. 61/614,062 filed Mar. 22, 2012, both of which are incorporated herein by reference in their entireties.

FIELD OF THE INVENTION

This invention relates to the elimination or reduction of nitrogen following the intake of atmospheric air in an internal combustion engine.

BACKGROUND OF THE INVENTION

The current accepted thinking is that global warming is due to green-house gas emissions, such as carbon dioxide ($CO_2$) and methane ($CH_4$). About a quarter of global carbon dioxide emissions currently come from mobile sources. This fraction could grow rapidly with the projected surge in car ownership in developing countries. Since nitrogen comprises almost 80% of the gas in the earth's atmosphere, its presence in the combustion chamber of internal combustion engines cumulatively results in a substantial volume of oxidation products, referred to generally as $NO_x$ pollutants. Although the catalytic converter is able to convert many of these undesirable compounds, it has been recognized that the reduction or elimination of nitrogen from the air/fuel mixture would be highly desirable. Air pollution management from mobile sources has many challenges, such as space and weight limitations, the economy of scale working against this application and fast dynamic operation of the mobile sources.

An oxy-combustion process for use in stationary power generation plants or in internal combustion engines, is proposed in U.S. Pat. No. 6,170,264 which process includes an air separation step for separating nitrogen from the air prior to the use of the air to combust a hydrocarbon fuel so that nitrogen oxide and other pollutants are reduced or eliminated as by-products of combustion. A further reduction of harmful pollutants such as sulfur, sulfides and various nitrogen oxides ($NO_x$) is proposed by using highly refined fuel such as hydrogen, methane, propane, purified natural gas, and light alcohols such ethanol and methanol.

It is specifically proposed in the '264 patent that an air separation plant use a membrane-based air separation system to separate the air into its component parts by passing an air feedstream under pressure over a membrane. The pressure gradient across the membrane causes the most permeable components to pass through the membrane more rapidly than other components, thereby producing a product stream that is enriched in the permeate component, while the original feedstream is depleted in that component. Many membranes can operate at ambient temperatures. Several types of membranes and their characteristics are described. Cellulose acetate membranes are said to exhibit good separation factors for oxygen and nitrogen, but have relatively low flux rates. Film composite membranes placed over a microporous polysulfone substrate exhibit lower separation factors than cellulose acetate, but have higher flux rates at the same pressure differential. Providing multiple membranes in series can increase the oxygen concentration in the product stream.

Electroceramic membranes, which are ionic solid solutions that permit movement of ions, require relatively higher temperatures of about 800° F. to mobilize the oxide ion when separating oxygen from the air feedstream. In the example of FIG. 12 in the '264 patent, the combustion exhaust gas, referred to as the "working fluid" is routed to a heat exchanger which in turn heats the electroceramic membrane to the desired operating temperature of 800° F. The patent identifies yttria stabilized zirconia as a possible material for the electroceramic membrane.

The '264 patent also contemplates that a membrane could be used to pass nitrogen and thereby reduce the nitrogen content of the remaining air feedstream. In this mode of operation, the nitrogen enriched stream will be on the outlet side of the membrane and the oxygen-enriched stream will be the retentate. Since the rate of diffusion through the membrane is determined by ion mobility, which in turn is a characteristic of a particular material and is dependent on the size, charge and geometry of the cations in the lattice, the geometry and location of the electroceramic membrane(s) will be determined by its mode of operation.

U.S. Pat. No. 5,051,113 discloses an air intake system for mobile engines that utilizes a selectively permeable membrane to effect oxygen enrichment of the air entering the engine intake in order to improve engine efficiency. The disclosure of U.S. Pat. No. 5,051,113 is incorporated herein by reference. The system utilizes a perfluorodioxole membrane that has an oxygen/nitrogen selectivity of at least 1.4:1 and provides from about a 10% to a maximum of 66% increase in $O_2$ under optimum conditions, and otherwise from about 10% to 30% increase of $O_2$ in the intake gas. Unlike oxy-combustion, as a result of the limitation of the membrane oxygen/nitrogen selectivity, the '113 patent's oxygen enrichment process does not eliminate the majority of the $NO_x$ pollutants.

A major problem associated with use of the oxy-combustion process in motor vehicles powered by internal combustion engines is how to minimize the additional weight and space required by the air separation components that are disclosed as necessary for the practice of the process by the prior art, e.g., the '264 patent. For example, size and weight of the additional apparatus required for the step of cycling of exhaust gases through a heat exchanger in order to achieve the 800° F. operating temperature for the electroceramic membrane will be seen by the automotive designer concerned with miles per gallon ratings and vehicle weight to be a significant disadvantage of that process.

In fact, most of the problems faced in reducing pollution emissions from motor vehicles are not present in addressing the reduction of the same pollutants from fixed electrical power generation plants, since floor space and/or overhead space is not limited. Electrical power and other utilities are also readily available in power generation plants to run auxiliary equipment, such as the compressors that are used in the air separation step.

Thus, one problem to be solved is how to achieve the known advantages of oxy-combustion in an ICE used to power a motor vehicle, while minimizing adverse effects on the overall efficient operation of the motor vehicle that are associated with the increase in weight of additional components and the power requirements associated with the air separation step.

SUMMARY OF THE INVENTION

To overcome these problems, the present invention provides a method and apparatus for the oxy-combustion of fuel in an ICE used to power a vehicle which method uses free energy available onboard the vehicle in the form of waste heat to separate oxygen from air, eliminate or significantly reduce the volume of nitrogen entering the combustion chamber, and thereby provide a corresponding reduction in $NO_x$ pollutants released into the atmosphere. In a preferred embodiment, the invention is integrated with a method and apparatus to capture $CO_2$ from the engine exhaust stream, which is now low in nitrogen and contains a very low level of $NO_x$ gases, and to increase the density of the $CO_2$ for temporary storage until it is discharged at a recovery station, e.g., during vehicle refueling.

Oxygen is separated from air and combusted with fuel to produce pure or almost pure exhaust products of $CO_2$ and water ($H_2O$). The $H_2O$ can readily be condensed and separated before the $CO_2$ is densified and temporarily stored onboard the vehicle. The approach of combusting oxygen with fuel is referred to as oxy-combustion and various technologies are available for the separation of $O_2$ from atmospheric air.

A commercial process for separating oxygen from air is based on the use of ion transport membranes (ITMs) that are made from solid ceramic materials that conduct oxygen ions at elevated temperatures and ambient pressure. A ITM oxygen process is available from Ceramatec, Inc. of Salt Lake City, Utah, USA. The ITMs are used to separate high-purity oxygen from atmospheric air. Air Products and Chemicals, Inc. of Allentown, Pa., USA is also engaged in the commercialization of the ITM oxygen separation process.

The ceramic oxygen generator is a portable oxygen generator that uses a solid ceramic electrolyte positioned between two porous electrodes to produce oxygen. In order to facilitate the mobility of the oxide ions, the ceramic membrane is heated to approximately 700° C. The cells are also able to produce oxygen at above their rated design capacity by increasing the operating temperature and the electrical potential applied.

An electrolyte assembly for use in a solid electrochemical membrane oxygen separation cell having improved performance characteristic is described in U.S. Pat. No. 5,021,137, assigned to Ceramatec, Inc., the disclosure of which is incorporated herein by reference. The electrolyte includes cerium oxide, or ceria, doped with calcium oxide, strontium oxide or yttrium oxide, with a pair of electrodes of sintered lanthanum strontium cobalite covered with a thin layer of silver.

This system is based on the infinite selectivity of oxygen ion migration through a dense solid ceramic electrolyte membrane under the influence of an externally applied electrical potential. The solid electrolyte is formed from cerium oxide with dopants added to enhance both ion transport and membrane processability. The oxidation and reduction reactions are promoted by the use of porous perovskite electrodes, which together with the planar ceramic electrolytic membrane elements form an electrochemical cell; a plurality of cells are combined to form a stack. Stacks comprising multiple cells in a planar configuration provide excellent electrochemical performance and stability, mechanical integrity and the capacity to produce high-purity oxygen over thousands of hours of use. The oxygen generator system based on ion transport membranes includes an integrated thermal management system, air mover, power supply and associated control systems.

A significant amount of thermal energy is generated and thermal management includes insulating the stack(s) from the local environment to maintain the required operating temperature of the cell in order to minimize the electrical power used for heating. A high efficiency heat recovery device is utilized to recover the energy value from the heat of the depleted exhaust air and from the oxygen. By recovering the heat energy, the electrical power consumption can be minimized.

The solid electrolyte ceramic membrane can be supported by a nickel superalloy matrix to make the oxygen generator cells much less prone to cracking due to the forces of expansion and contraction associated with the heating and cooling of the stacks during start-up and shutdown of the ICE.

An air separation process that can be utilized in the practice of the invention is based upon an oxygen capture and storage process which utilizes a solid adsorbent that removes and retains $O_2$ from atmospheric air passing over a fixed or fluidized bed operating at an initial temperature. When the adsorbent becomes saturated with $O_2$ or has reached a predetermined level of retained oxygen, a sweep gas is passed over the bed to release the adsorbed oxygen. Two or more adsorbent beds can be operated in parallel, with one or more beds adsorbing oxygen and the remaining bed or beds being subjected to recovery of essentially pure oxygen mixed with the sweep gas. One such system is available from the Linde Group and is referred to as the Ceramic Autothermal Recovery (CAR) oxygen generation process. One suitable class of adsorption and storage materials are perovskites. The sweep gas can be a portion of the hot exhaust gases from the ICE which are principally $CO_2$ and water vapor. The sweep gas can be diverted from the exhaust stream and enter the cylinder with the fuel. A portion of the exhaust gas stream, including water vapor, can be recycled with the fuel mixture to control the temperature of the engine in accordance with exhaust gas recycling (EGR) methods and apparatus that are well known in the art.

Other commercially available processes and apparatus for separating oxygen and nitrogen from atmospheric air can be employed in the practice of the present invention. A nitrogen generator sold by the Parker Bolston division of Parker Hannifin Corporation utilizes membranes which separate compressed air into a stream containing 95-99% pure nitrogen as the retentate. The semi-permeable membranes consist of bundles of individual hollow fibers, each of which has a circular cross-section and uniform bore through its center. Because of their small size, a great many of the fibers can be packed into a small space. The effect is an extremely large membrane surface area that can produce a relatively high volume product stream. Compressed air introduced into one end of the module enters the membrane passing through the fiber bores. Oxygen, water vapor and other trace gases easily permeate the membrane fiber and are discharged through a permeate port; nitrogen is contained within the membrane and is discharged through the outlet port of the membrane module. One or more of the membrane modules can be installed in the air intake by the manifold of the ICE and fed by compressed air from a supercharger powered by the engine or a turbo-supercharger driven by the exhaust gas stream. The nitrogen separated from the atmospheric air can be discharged through an orifice in the manifold to the atmosphere. In an alternative embodiment, one or more modules can be employed to introduce oxygen directly to the cylinder intake port for mixing with the fuel, with the separated nitrogen being discharged into the atmosphere.

An oxygen-enriched air stream can also be recovered from pressure swing adsorption (PSA) nitrogen generators that are commercially available from Balston. The PSA nitrogen generator utilizes a combination of filtration and pressure swing adsorption. A pre-filtered stream of compressed air is passed through a bed of carbon molecular sieves (CMS) which have a greater affinity for oxygen, carbon dioxide and water vapor, and allow the nitrogen to pass through the bed. The adsorbed oxygen and other gases are released at a lower pressure. By raising and lowering the pressure on the CMS bed, the oxygen and other gases are captured and released, respectively, leaving the CMS unchanged. As in the other processes, utilizing the PSA process, the nitrogen passing through the bed is released into the atmosphere. In order to provide a continuous flow of oxygen, two or more CMS beds are operated sequentially. Compressed atmospheric air is preferably provided by a turbo-supercharger; more highly pressurized atmospheric air can be provided by an auxiliary air compressor, e.g., a supercharger, piston pump, lobed blower or rotary vane pump driven by the fan belt of the ICE.

Commercially available vacuum swing adsorption (VSA) systems and hybrid vacuum-pressure swing adsorption (VPSA) systems utilizing activated carbon-based molecular sieves or sorbents to capture oxygen from atmospheric air can be utilized. Alumina in combination with zeolite silicate that trap nitrogen are capable of producing oxygen at purities from 90-95% can also be utilized in the method of the invention. Commercial systems utilizing lithium-based adsorbents having greater selectivity and higher mass transfer rates can also be applied for use in the present invention. Radial beds can be employed in addition to the conventional longitudinal pass through beds. The relatively low energy requirements and compact size of these systems represent an advantage for use of onboard ICE-powered vehicles over other well known methods and apparatus for separating oxygen from the air.

Another PSA process for the separation of oxygen from ambient air utilizes a bed of granular aluminosilicate, or zeolite, that is placed in one, but preferably at least two canisters through which a pressurized stream of air is passed. The nitrogen is adsorbed into the structure of the zeolite particles and the oxygen and other atmospheric gases pass through the bed and are discharged from the canister and recovered for use in the oxy-combustion process. When the zeolite in the separation container has reached a predetermined level of adsorbed nitrogen, the pressure is reduced and the nitrogen is released from the zeolite and back-washed with the pure oxygen. In order to provide an uninterrupted flow of oxygen while the zeolite is being purged of the adsorbed nitrogen, the pressurized air stream is introduced into at least one other canister of zeolite. Alternatively, pressurized oxygen from a single container can be stored in a pressure vessel having sufficient capacity to meet the requirements of the ICE, at least under most operational conditions.

Since zeolite is sensitive to moisture, the air can be passed through a guard bed of silica gel to remove the moisture so that water is not formed when the air is pressurized to the dew point.

In an alternative vacuum-assisted PSA process, a vacuum is applied to release the nitrogen from the zeolite, thereby enabling the initial increased pressure applied to the ambient air to be kept below the due point of the moisture in the ambient air. The same effective differential pressure is applied to the zeolite during the nitrogen adsorption and desorption cycle.

In a further alternative embodiment, oxygen can be obtained for use in the oxy-combustion of the fuel by a conventional cryogenic air separation process practiced on board the vehicle. Oxygen liquefaction is well known and the on-board storage of the liquid oxygen provides the advantage of requiring a relatively small space. A further advantage of the on-board liquefaction process is that it can be operated continuously at the maximum system rating to produce liquefied oxygen for storage in the on-board cryogenic tank, regardless of the transitory fuel and oxygen demand of the ICE. The oxygen can then be dispensed to the engine intake or other location for mixing with the fuel and any exhaust gas that is being recycled to the ICE for temperature control. In the event that insufficient oxygen is available in the cryogenic tank, the engine management system increases the amount of atmospheric air to the ICE intake to assure satisfactory engine performance.

In a first embodiment of the present invention, the air intake manifold of an ICE is provided with at least one, but preferably a plurality of air separation membranes in series to produce the required flow of pure oxygen, while discharging the nitrogen to the atmosphere. In order to account for the pressure drop across the one or more membranes, a larger air intake manifold can be provided and/or a turbo-supercharger, blower or other means installed upstream of the membrane(s) to increase the pressure and flow rate of the intake air in excess of that which is created by the intake stroke in the operation of the two-stroke or four-stroke ICE.

Each membrane can be placed transverse to the direction of the intake air flow in order to maintain a high pressure zone on the retentate side of the membrane, while a low pressure zone is created by the down stroke of the ICE when the intake valve is open. In an alternative embodiment, the sidewalls of the intake manifold can be provided with one or more air separation membranes oriented parallel to the path of the intake air's movement and in communication with atmospheric air which passes oxygen from the atmospheric air surrounding the engine into the low pressure zone that exists inside the manifold channels. In this configuration, the nitrogen retentate remains part of the surrounding atmosphere, thereby simplifying the apparatus required for the oxygen separation step.

In a further aspect of the invention, the air intake manifold is provided with an atmospheric air auxiliary inlet valve which can be directed to open and admit atmospheric air in the event that the engine requirements for oxygen cannot be met by the volume of oxygen passing through the membranes. In this embodiment, conventional sensors provide data to the vehicle's onboard computing and control system, or engine management system (EMS) for analysis in real time. The computer's processor/controller directs the operation of the auxiliary intake valve to admit sufficient supplemental air to support the combustion of the fuel required to meet the load, acceleration and/or other conditions imposed upon the ICE. Such control systems, sensors and the analytics are well known and are in commercial use in the automotive industry.

In another aspect of the invention, the air intake valve and/or associated valve stem incorporates an oxygen separating membrane. During the air intake down stroke of the four-stroke ICE, the low pressure inside of the cylinder creates a substantial pressure drop across the membrane favoring the passage of oxygen. During the compression stroke, a housing or other cover mounted on the valve stem covers the surface of the membrane to block or otherwise prevent the reverse flow of the fuel and oxygen/air mixture in accordance with the customary mode of operation of the air intake valve. The membrane cover also prevents passage of the combustion gases following ignition of the fuel/oxygen mixture in the cylinder during the power stroke and the following exhaust stroke as the hot exhaust gases are expelled from the cylinder into the exhaust manifold. In order to enhance the volumetric flow rate of oxygen through the membrane to satisfy the requirements for the complete combustion of the fuel, the surface area of the valve/membrane combination can be made larger than that which would be used in the conventional ICE in which the air is admitted to the cylinder without significant restriction. A turbocharger or other source of compressed air can be utilized to enhance the volumetric flow rate of the oxygen permeate entering the cylinder through the membrane.

In another embodiment of the present invention, one or more air separation membranes are positioned in the wall of one or more of the plurality of cylinders in the ICE. The membranes provide fluid communication for oxygen molecules separated from atmospheric air passing through air channels on the exterior or retentate side of the membranes through which pressurized air is passed. In an embodiment of an ICE having a plurality of cylinders, e.g., eight or ten, some of which are selectively put into or taken out of service based upon the demands placed on the ICE, the cylinders that are subject to intermittent service can be operated conventionally using atmospheric air to meet the high service or high performance demands. The remaining cylinders which are in continuous service are fitted with cylinder wall membranes that operate to eliminate or substantially reduce the volume of nitrogen passing through the cylinder and which form undesired $NO_x$ compounds in the exhaust gases. A high performance engine operated using this configuration will produce far less $NO_x$ than a comparable engine in which 100% of the combustion gases is atmospheric air.

As will be understood by one of ordinary skill in the art, in the event that the air separation membranes in the cylinder walls are capable of providing all of the foreseeable oxygen demands under all operating conditions of the ICE, the air intake valve and associated operating mechanisms can be entirely eliminated. This configuration can be adopted where the engine has relatively low performance characteristics, i.e., its acceleration capability and total horsepower are relatively low compared to other high performance engines.

In an embodiment in which the membrane forms part of the cylinder wall, or is located in fluid communication with an air channel, the impact of the power stroke can be reduced by positioning the membranes in a lower portion of the cylinder so that they are below the piston rings when the oxy-fuel or oxygen-enriched fuel mixture is ignited. In an embodiment, the membrane can be isolated from the high pressure stages in the cylinder and covered during the down stroke by a sliding or shutter valve, the outer surface of which valve is contiguous with the adjacent interior surface of the cylinder wall. The closing of the isolating valve can be coordinated with the movement of the piston and exhaust valve for that cylinder. Alternatively, the cylinder wall can be perforated and the air separation membranes positioned in the engine block behind the surface of the cylinder wall and in alignment with the perforations. An internal sliding or shutter valve can be employed to cover and isolate the membrane and to open during the air intake stroke.

In those embodiments in which oxygen passes through the air separation membrane and nitrogen is retained in the original atmospheric air intake stream, the intake manifold and/or the engine block is provided with channels for passage of the atmospheric air to the membrane and for discharge of the retentate nitrogen into the atmosphere. The same or additional channels can be used in the event that auxiliary air intake valves are provided to admit supplemental atmospheric air under conditions of heavy load, acceleration and the like. The passage of atmospheric air through such channels which form an integral part of the intake manifold and the engine block will result in the heating and expansion of the air, thereby utilizing engine waste heat to improve the process and reduce the heat load on the liquid engine coolant system. The positioning of the air separation membranes in the manifold and engine block which form the walls of the cylinders also serves to bring the membranes up to an operating temperature that corresponds to that of the metal engine elements in which they are positioned, avoiding the need for separate heat exchangers and associated conduits described by the prior art.

The elimination or reduction in the volume of nitrogen drawn into the cylinder will result in an increase in the oxy-combustion gas temperature. In order to control the temperature of the combustion process in the engine, a portion of the exhaust stream can be recycled and mixed with the oxygen-enriched fuel mixture, or separately reintroduced into the cylinder prior to combustion in place of the nitrogen that has been removed. On-board computer processor-controlled methods for controlling exhaust gas recirculation, or ERG, have been well known in the automotive industry for many years. The engine operating temperature can also be reduced by the addition of water or water vapor to the fuel mixture. In addition to eliminating or reducing the $NO_x$ products emitted, other pollutants such as $SO_x$ compounds can also be eliminated or reduced by the use of clean burning fuels that produce substantially only $CO_2$ and water vapor.

In order to optimize the process of the invention when exhaust gas recirculation results in the mixing of the CO2 in the exhaust gas with atmospheric air, it is preferred to separate the nitrogen from the oxygen and CO2. Several methods have been reported to separate nitrogen gas from a mixed stream that comprises mainly nitrogen, oxygen, carbon dioxide and water. These methods utilize membranes and electrochemical processes, such as molten carbonate fuel cells and low temperature electrochemical cells.

For example, U.S. Pat. No. 4,781,907 discloses a process for the separation of nitrogen from combustion gases by utilizing selective gas-permeable polymer membranes. The process produces nitrogen gas with a purity in excess of 97% by volume. The membranes can be made from a cellulose ester; from silage, Sloane or silicone polymers; polyphenylene oxides; polyamides; polyimides; polysulfones; polycarbonates; polyacrylonitriles; polytetrafluoroethylenes; polyesters polyolefins; polyvinyl alcohols; poly (4-vinyl pyridine), and polyurethanes, as well as combinations of these materials.

In a molten carbonate fuel cell, carbonate ions formed at the cathode by the combination of oxygen and carbon dioxide, represented by the first reaction scheme set forth below, migrate to the anode under an external electric potential where they decompose into oxygen and carbon dioxide, represented by the second reaction. This process is highly selective for the transport of carbonate anions at elevated temperatures, and being reversible produces high purity carbon dioxide and oxygen at the anode.

Cathode: $O_2 + 2CO_2 + 4e^- \rightarrow 2CO_3^{2-}$

Anode: $2CO_3^{2-} \rightarrow O_2 + 2CO_2 + 4e^-$ (2)

See, e.g., Sugiura et al. "The Carbon Dioxide Concentrator by using MCFC," Journal of Power Sources, 118, 2003, pp. 218-227.

A low temperature electrochemical cell in which an anion exchange membrane is sandwiched between gas-diffusion electrodes consisting of nickel-based anode electrocatalysts on carbon paper was reported by Pennline et al. "Separation of $CO_2$ from Flue Gas using Electrochemical Cells," Fuel, 89, 2010, pp. 1307-1314. In this process, oxygen is reduced to hydroxide ions at the cathode, represented by the first reaction below, which ions react with carbon dioxide to form bicarbonate ions in accordance with the second reaction scheme. The bicarbonate ions are transported across the membrane where the reverse reactions occur at the anode, reforming oxygen and carbon dioxide gases.

$$O_2 + 2H_2O + 4e^- \rightarrow 4OH^- \quad (3)$$

$$4OH^- + 4CO_2 \rightarrow 4HCO_3^- \quad (4)$$

$$4HCO_3^- \rightarrow O_2 + 4CO_2 + 2H_2O + 4e^- \quad (5)$$

To the extent that atmospheric air must be admitted to meet the non-steady state operational requirements of the ICE, e.g., during acceleration, hill climbing with a heavy load, or the like, the exhaust gas stream will contain, in addition to $CO_2$ and $H_2O$, nitrogen and some ppm level of $NO_x$. The $H_2O$ can be separated by reducing the temperature of the exhaust gas stream to form a condensate which is easily removed by known methods. The water can be discharged, or returned to the ICE for temperature control and improved fuel efficiency. The $CO_2$ can be separated from the nitrogen using processes including adsorption, absorption, membrane separation, electrochemical separators, liquification by compression/cooling, and combinations of these processes.

The method and apparatus of the invention for the oxy-combustion of fuel in an ICE is applicable to a wide range of mobile sources such as passenger vehicles, trucks, buses, heavy-duty construction and other specialized vehicles, trains, ships and others that are powered by the combustion of fossil-based fuels. This invention can be incorporated in the design and manufacture of internal combustion engines for new mobile sources and/or for retrofitting into existing mobile sources.

In a further aspect, this invention relates to the integration of the various components for efficient oxy-combustion in the ICE of a mobile source as has been described above, followed by $CO_2$ capture from the exhaust and temporary onboard storage using waste heat from the engine, mobile source, the engine's exhaust stream and the liquid coolant system. It includes the steps of: (a) $O_2$ separation using one or more component(s) or unit(s), (b) converting some of the waste heat into power (work energy), and (c) using this power to increase the density of captured $CO_2$ for temporary on-board storage and to power the $O_2$ separation unit. All or part of the energy requirements for these steps come from the engine waste heat (see example 1).

The waste heat produced by a typical engine consists mainly of hot exhaust gases (~600-650° C.) and hot coolant (~100-120° C.) as shown in FIG. 1. This heat energy totals about 60% of the energy that typical hydrocarbon (HC) fuels provide. Energy is needed to separate oxygen from and compress/liquefy or freeze all or part of the produced $CO_2$ for efficient onboard storage. This energy has to be a mix of work and heat energies. The work component of the energy is generated using part of the waste heat to produce this work. Some waste heat could be used to power an on-board $O_2$ separation unit. Part of the exhaust gases can be recycled to control the temperature of the engine.

During startup of the $CO_2$ capture cycle, or for a special need, part of the engine power, or the electricity stored in onboard batteries could be used. During normal operations, part of the energy required for capture and densification will come from the waste heat.

There are different means for the $O_2$ separation from air including membrane separation, reactive membrane system or small cryogenic system. The specific use in the limited volume available onboard mobile sources requires close analysis of many options. The formation of dense $CO_2$ for efficient onboard temporary storage is achieved by compression, liquefaction and/or freezing (to form dry ice) with a final density in the range of 5-1600 kg/m3. Part of or the full work energy required for the densification is obtained from the waste heat by using heat to power conversion.

The $CO_2$ densification component can be a single or multiple stage compression with the required active/passive cooling system to ensure pressurization, liquification or solidification of $CO_2$ before storage temporarily onboard. The $CO_2$ storage could be in the form of single or multiple tanks onboard the mobile sources. The fuel tank could also be used to store the captured $CO_2$ by having a moving partition between the fuel side and the $CO_2$ side. All components could be integrated with the mobile source control system or a separate control system to optimize performance.

BRIEF DESCRIPTION OF THE DRAWINGS

The invention will be described in further detail below and with reference to the attached drawings in which the same or similar elements are identified by the same number, and where.

DETAILED DESCRIPTION OF THE INVENTION

Figure 1:
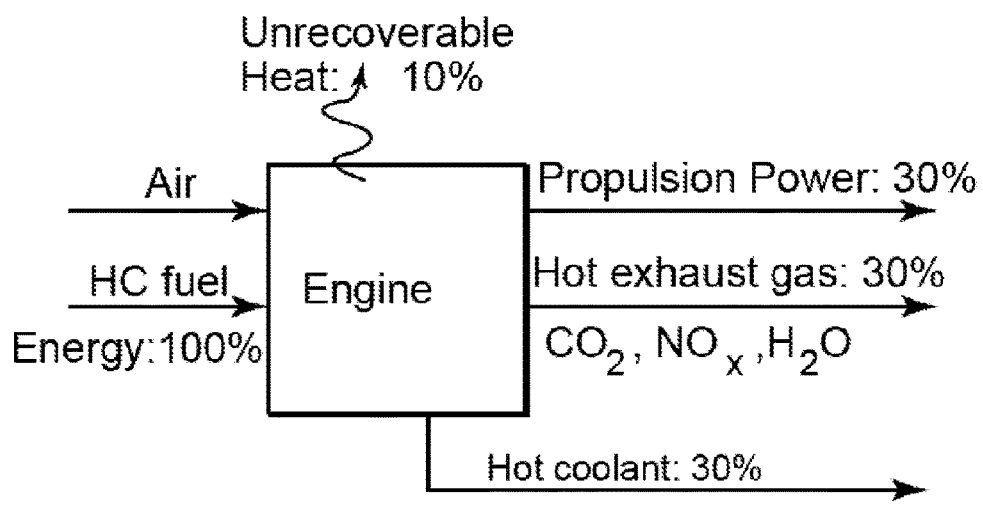
FIG. 1 is schematic illustration of the energy balance of a typical hydrocarbon fueled internal combustion engine of the prior art.
Figure 2:
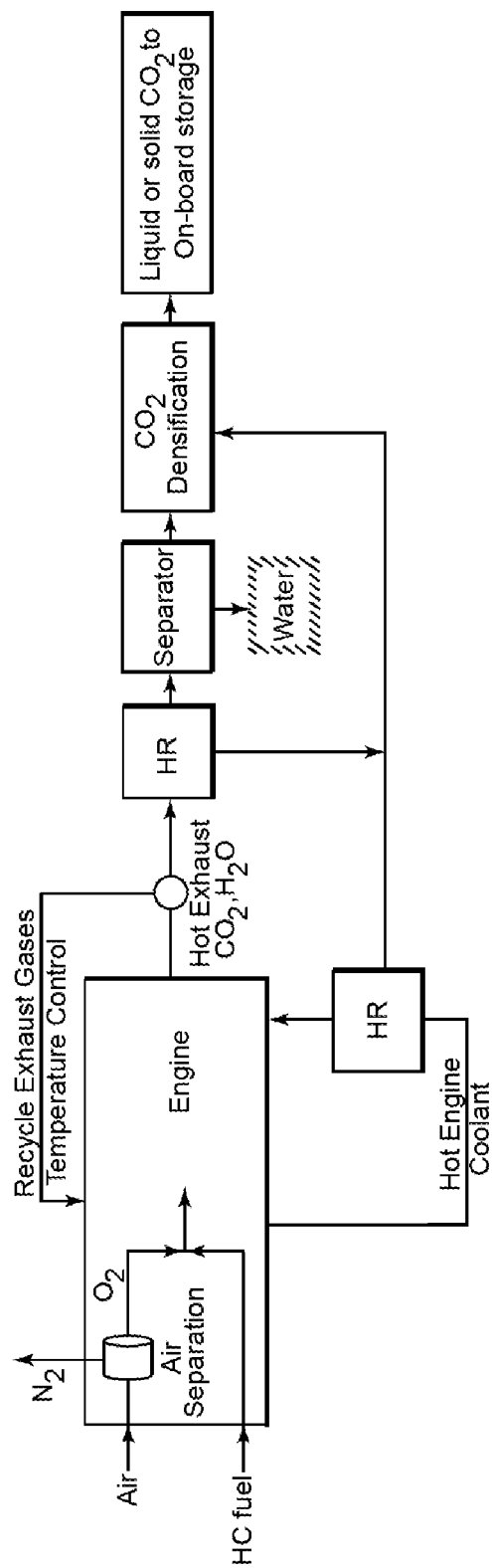
FIG. 2 is a schematic illustration of an embodiment of the oxy-combustion process of the present invention in combination with a process for the capture of $CO_2$ from the ICE exhaust stream and its densification for on-board storage.
Figure 3:
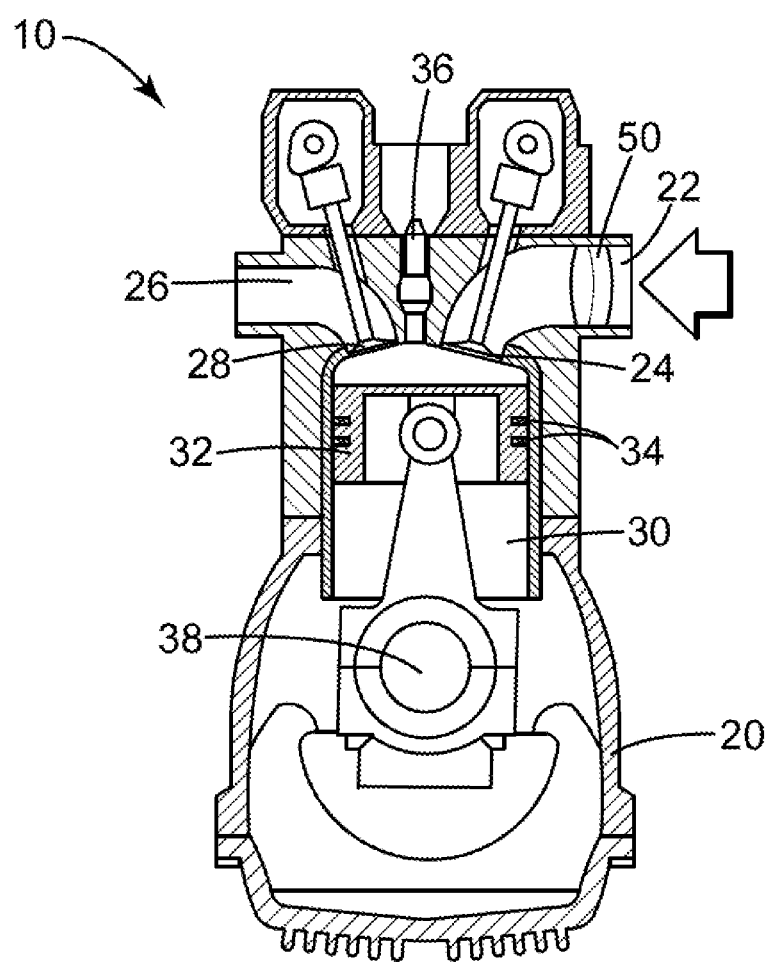
FIG. 3 is a simplified partial cross-sectional elevation view of the cylinder of an in-line or I-block ICE with an embodiment of the invention positioned in the air intake manifold.

Referring now to the simplified illustration in FIG. 3 of a cross-section view of a portion of an ICE 10 representative of a four-stroke cycle. The engine block 20 includes an intake manifold 22 the flow of air being controlled by intake valve 24 and an exhaust manifold 26 closed by exhaust valve 28. Cylinder 30 contains piston 32 which is fitted with one or more piston rings 34.

In accordance with conventional four-stroke engine operations, the intake down stroke commences with the closing of the exhaust valve 28 and the opening of the intake valve 24 that is coordinated with the down stroke of piston 32 which draws the mixture of air and fuel into the open portion of cylinder 30 from the intake manifold 22. During the compression stroke, both valves 24 and 28 are closed and the fuel/air mixture is compressed as the piston 32 moves to the top of the cylinder, the spark plug or other ignition device 36 ignites the fuel/air mixture and a controlled combustion occurs which drives the piston to the bottom of the cylinder 30 in the power down stroke, causing the crankshaft 38 to turn and provide the propelling force to the vehicle through a transmission and drive train (not shown). During the exhaust up stroke, exhaust valve 28 is opened and the hot exhaust gases exit through exhaust manifold 26, and the cycle is repeated with the closing of the exhaust valve 28 and opening of the intake valve 24.

In accordance with an embodiment of the present invention, an air separation membrane 50 is positioned in the intake air manifold 22 to pass oxygen into the cylinder during the air intake down stroke. Nitrogen present in the intake air stream is maintained on the upstream side of the membrane 50 as the retentate gas and is discharged from the manifold into the atmosphere. Since no nitrogen is exposed to the high temperature and pressure oxidation conditions during combustion, no $NO_x$ compounds are produced and emitted with the exhaust gas.

Figure 4:
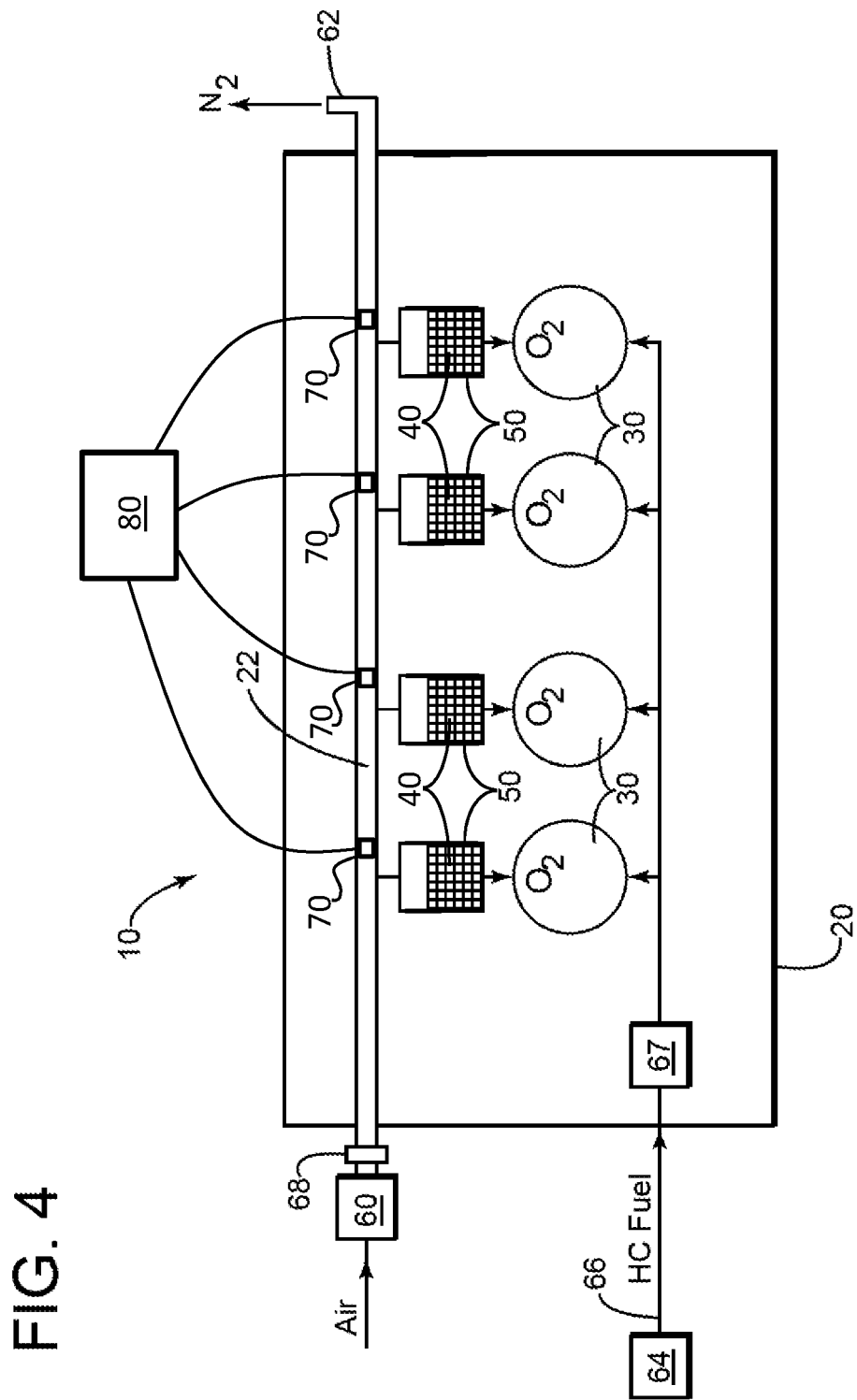
FIG. 4 is a simplified schematic illustration of an ICE and the embodiment corresponding to FIG. 3.

In order to maintain a pressure differential across the membrane 50 and allow the retentate nitrogen and any other atmospheric gases that do not pass through the membrane 50 to be released back into the atmosphere, the air intake manifold includes an orifice downstream of the membrane that is sized and configured to maintain a back pressure, while at the same time permitting the nitrogen-enriched retentate stream to be released into the atmosphere. This arrangement is illustrated schematically in FIG. 4 where the discharge orifice 62 as illustrated, a supercharger, or a super-turbocharger powered by the mass of the exhaust gas stream, or other pressurizing device 60 that raises the pressure of the air supplied to the cylinders, directs pressurized atmospheric air via air manifold inlet 68 into air intake manifold 22 which is provided with an outlet to each of the cylinder intake ports of the four cylinders 30. The manifold 22 terminates in an orifice 62 positioned downstream of the last cylinder. In this simplified schematic illustration of one embodiment of the invention, fuel is delivered from tank 64 via fuel line 66 to fuel pump 67 and into cylinders 30.

As will be understood by one of ordinary skill in the art, additional elements from the prior art are required for the operation of the system which are omitted in the interest of clarity and understanding of the principal features of the present invention. For example, a plurality of fuel injection ports or nozzles can be utilized to more evenly distribute the fuel in the air intake manifold 22 and assure a more uniform mixture in response to changes in load, sudden acceleration or deceleration, and other changes in the operating conditions of the ICE. Although the invention is being illustrated with reference to an engine having an I-block configuration, most automobile engines on the market are equipped with V-blocks, which can contain from four, six, eight or even ten cylinders. Although the configuration of the air intake manifold corresponding to element 22 in the figures is more complex than the essentially straight air intake manifold used with an I-block engine, the general principles of operation of the air separation membranes described above apply. For example, the air intake manifold of each cylinder can be provided with a retentate orifice downstream of the membrane 50 (not shown).

It is also to be understood that the fuel is added to the oxygen downstream of the membrane 50 and an opportunity for adequate mixing of the fuel/oxygen-enriched air mixture must be provided. Additionally, membrane 50 comprises two or more fixed beds 40 containing an adsorbent material that releasably adsorbs oxygen from the air and passes the non-adsorbed gases for discharge to the atmosphere. In certain embodiments, oxygen sensors 70 can be located in the oxygen-depleted gas stream outlet of each of the two or more fixed beds 40. An engine management system 80 having a processor/controller is operatively linked to each of the oxygen sensors 70.

Figure 5:
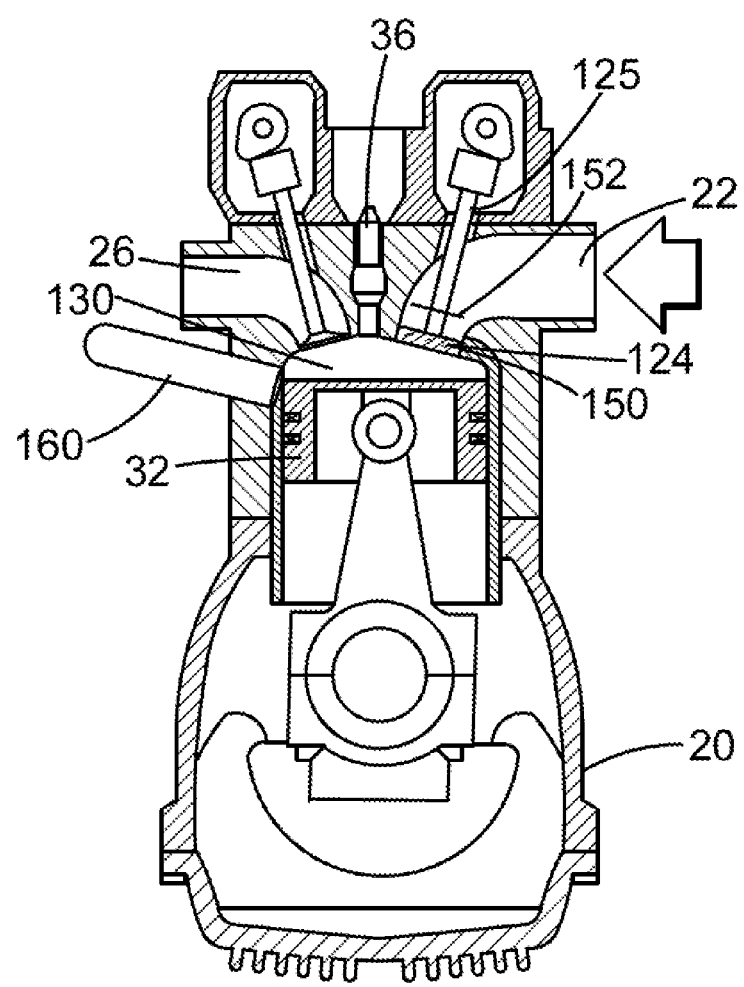
FIG. 5 is a simplified partial cross-sectional view similar to FIG. 3 that includes another embodiment of the invention in conjunction with the air intake valve.

In an embodiment of the invention illustrated in FIG. 5, an air separation membrane 150 is incorporated into the inlet valve 124. Fuel is introduced directly into the cylinder 130 via direct fuel injection system 160, which is also known as gasoline direct injection or GDI. In the direct fuel injection system depicted, the fuel is highly pressurized and is introduced directly into the cylinder during the down stroke and it is mixed with the oxygen or air-enriched oxygen that has passed through the air separation membrane 150. The direct fuel injection, or GDI system enables a stratified fuel charge combustion, or ultra-lean burn, to improve fuel efficiency and reduce emission levels under low ICE loads. The valve assembly 124 containing the membrane 150 remains closed during the intake down stroke. During the compression stroke and the power stroke when the fuel is combusted, a fuel-tight cover 152 mounted on valve stem 125 is lowered to prevent loss of the fuel and air mixture and the pressure of the down stroke through the membrane. As will be apparent to one of ordinary skill in the art, this arrangement will require some modification of the valve stem and the associated operating mechanism. A further advantage of the adaptation of the invention to this embodiment is that fewer modifications are required to the structure and mode of operation of a direct fuel injection system.

In an alternative of this embodiment, the valve assembly 124 containing the air separation membrane 150 remains closed for all or a portion of the intake down stroke and is open for a portion in order to admit a volume of atmospheric air that is required to support combustion. In another alternative embodiment, the cylinder head is provided with at least one additional air intake manifold port and intake valve that admits atmospheric oxygen directly and a second port that admits oxygen that has passed through the air separation membrane 150 as described above in connection with FIG. 5 or through a membrane 50 as previously described in connection with FIG. 3

Figure 6:
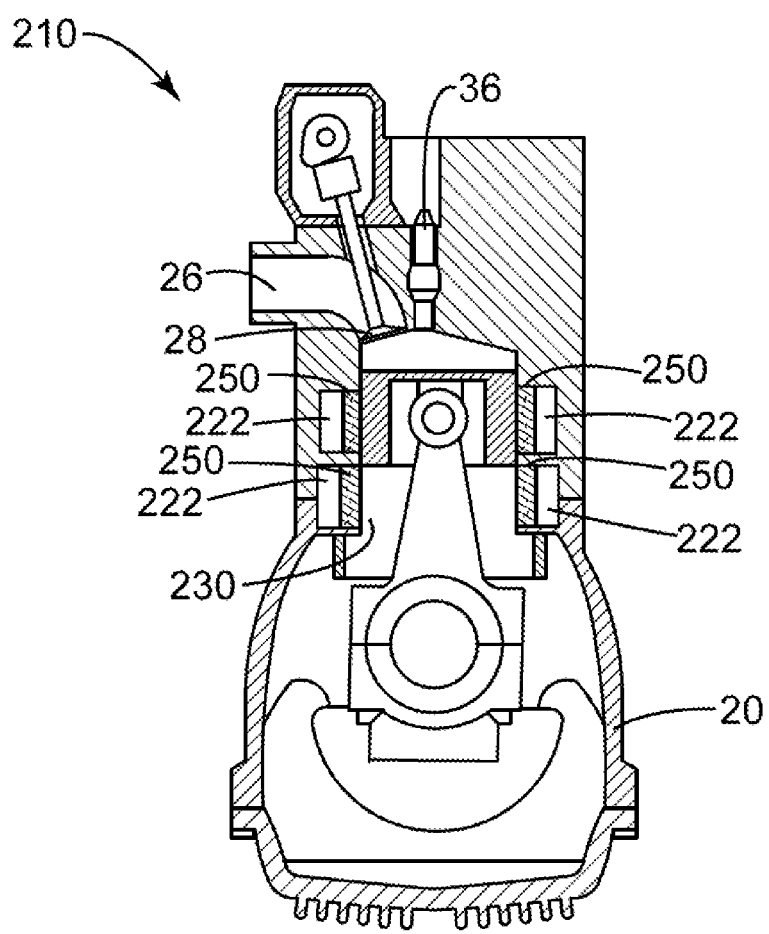
FIG. 6 is a simplified partial cross-sectional elevation view of the cylinder of an in-line or I-block engine that has been modified in accordance with another embodiment of the invention.

Referring now to FIG. 6 an embodiment will be described in which one or more air separation membranes 250 that pass oxygen are integrated into the wall of all or a selected number of the cylinders 230 in a modified ICE 210. As shown in this cross-sectional view, air separation membranes 250 are positioned in the cylinder walls 230 and are supplied with atmospheric air passing through manifolds, or atmospheric air delivery channels 222. The air delivery channels can surround the periphery of the cylinder in order to increase the surface area of membranes serving each cylinder. A sufficient number of membranes 250 are provided to meet the oxygen requirements for complete combustion of the fuel in the cylinder under the range of operating specifications of the ICE. As a result, the intake valve assembly and air intake manifold inlet to the cylinder are eliminated, thus simplifying the construction of the engine. As in the earlier embodiments, the retentate nitrogen and any other atmospheric gases are released to the atmosphere via one or more orifices which allow for the flow of fresh atmospheric air to the membranes.

In order to prevent the reverse flow of gases and fuel during the compression stroke and the passage of hot combustion gases during the compression stroke, power stroke and exhaust stroke, a membrane cover can be provided to isolate the oxygen-passing membranes from the compressed gases in the cylinder. As will be understood by one of ordinary skill in the art, the engine block and cylinder walls are modified to provide for the installation of the membranes 250 and to provide communicating internal manifolds or air channels 222 for the introduction of pressurized atmospheric air.

In order to inhibit the reverse flow of gases from the combustion chamber during the compression and power strokes, a membrane material is utilized that restricts or impedes the flow of nitrogen, $NO_x$ and $CO_2$. In the case of a solid ceramic electrolyte, the current is interrupted to discontinue the ion transport through the electrolyte.

In an alternative embodiment, an additional valve is provided in the cylinder head to admit atmospheric air in order to meet oxygen requirements associated with rapid acceleration, increased loads and the like. In the event that atmospheric air is admitted to the cylinder to support the complete combustion of the fuel, some $NO_x$ compounds will be produced and emitted in the exhaust gases. The same valve, or an additional valve in the cylinder head, can be utilized to recirculate hot exhaust gases in order to control the combustion temperature and therefore the heat transferred to the engine block and its associated components.

The $O_2$ separation unit or membrane can be adapted for use in different types of internal combustion engines and propulsion systems. For example, the invention can be used with 4-stroke, 2-stroke, 6-stroke, Wankle, Atkinson, Stirling, gnome, gas turbine, jet, wave disc, and other types driven by the combustion of any type of hydrocarbon fuel.

Since pure or nearly pure $O_2$ is combusted with the fuel, the resulting combustion product will constitute principally $CO_2$ and $H_2O$. The water can readily be condensed and separated to provide a pure, or nearly pure $CO_2$ stream for densification and storage. In addition, the elimination or reduction of nitrogen oxide products ($NO_x$), unburned hydrocarbons, carbon monoxide and other by-products eliminate or reduce the need for the catalytic converter or other on-board exhaust gas stream treatment systems.

While the foregoing desorption and the attached drawings are representative of various embodiments and examples of the invention, additional embodiments will be apparent to those of ordinary skill in the art and the scope of protection for the invention is to be determined by the claims that follow.

The invention claimed is:

1. An internal combustion engine (ICE) producing an exhaust gas stream having reduced nitrogen and $NO_x$ emissions from the combustion of a fuel with an oxygen-enriched. atmospheric air stream from which nitrogen has been separated,
the ICE having an engine block with a plurality of cylinders having walls forming combustion chambers and one or more channels in fluid communication with the cylinders for delivering the oxygen-enriched air for combustion of the fuel,
the improvement comprising:
one or more air separation devices integrated with the operation of the ICE and in fluid communication with the engine's air intake and the combustion chambers, the one or more air separation devices being adapted and configured to separate oxygen molecules from the atmospheric air to mix with the fuel and to return nitrogen molecules to the atmosphere,
wherein the channels are in the form of a manifold and one or more air separation devices are positioned in the manifold, and
where the air separation devices are ceramic membranes which pass oxygen molecules from the manifold to one or more of the combustion chambers of the ICE.

2. The ICE of claim 1 in which there are a plurality of air separation devices and the devices are positioned in series and the proportional oxygen content of the gas stream is greater downstream of each of the separation devices in the series.

3. The ICE of claim 1 in which the ceramic membrane material is a perovskite type ceramic and releases retained oxygen in response to an increase in temperature.

4. The ICE of claim 3 in which the membranes are maintained at a temperature of about 800° F. by heat exchange with hot exhaust gases from the engine.

5. The ICE of claim 1 in which the membrane is a solid ceramic electrolyte with porous electrodes that are oxygen permeable and the solid electrolyte passes oxygen ions under an electrical potential.

6. The ICE of claim 1 in which a portion of the exhaust gas stream from the ICE is recycled and mixed with the intake air.

7. The ICE of claim 1 which includes a turbo-supercharger powered by the exhaust gas stream and in fluid communication with the atmospheric air to pressurize the air upstream of the one or more separation devices.

8. An internal combustion engine (ICE) producing an exhaust gas stream having reduced nitrogen and $NO_x$ emissions from the combustion of a fuel with an oxygen-enriched atmospheric air stream from which nitrogen has been separated,
the ICE having an engine block with a plurality of cylinders having walls forming combustion chambers and one or more channels in fluid communication with the cylinders for delivering the oxygen-enriched air combustion of the fuel,
the improvement comprising:
one or more air separation devices integrated with the operation of the ICE and in fluid communication with the engine's air intake and the combustion chambers, the one or more air separation devices being adapted and configured to separate oxygen molecules from the atmospheric air to mix with the fuel and to return nitrogen molecules to the atmosphere,
wherein the channels are in the form of a manifold and one or more air separation devices are positions in the manifold, and
where the one or more air separation devices comprise two or more fixed beds containing an adsorbent material that releasably adsorbs oxygen from the air and passes the non-adsorbed gases for discharge into the atmosphere, each of the beds having an inlet for receiving an oxygen-depleted purge gas to release the adsorbed oxygen and an outlet in fluid communication with one or more of the plurality of cylinders for conveying the oxygen-enriched gas stream to mix with the fuel.

9. The ICE of claim 8 in which the purge gas is a portion of the hot exhaust gas from the ICE.

10. The ICE of claim 8 that operates in conjunction with an engine management system having a processor/controller operatively linked to at least one oxygen sensor located in the oxygen-depleted gas stream outlet of each of the two or more fixed beds, at least one valve associated with the inlet and outlet of each bed and controlled by the processor/controller in response to the amount of oxygen in the oxygen-depleted gas stream to divert air from one bed to at least one other bed and to admit the purge gas to release the adsorbed oxygen for discharge from the bed outlet as the oxygen-enriched stream.

11. An internal combustion engine (ICE) producing an exhaust gas stream having reduced nitrogen and $NO_x$ emissions from the combustion of a fuel with an oxygen-enriched atmospheric air stream from which nitrogen has been separated, the ICE having an engine block with a plurality of cylinders having walls forming combustion chambers and one or more channels in fluid communication with the cylinders for delivering the oxygen-enriched air for combustion of the fuel, the improvement comprising:

one or more air separation devices integrated with the operation of the ICE and in fluid communication with the engine's air intake and the combustion chambers, the one or more air separation devices being adapted and configured to separate oxygen molecules from the atmospheric air to mix with the fuel and to return nitrogen molecules to the atmosphere, wherein the channels are in the form of a manifold and one or more air separation devices are positions in the manifold, and where the one or more air separation devices are selected from the group consisting of pressure swing adsorption nitrogen generators, vacuum swing adsorption systems and hybrid vacuum-pressure swing adsorption systems.

12. The ICE of claims 1, 8 or 11 in which the $CO_2$ from the exhaust stream is captured and undergoes a densification process for temporary storage on board a vehicle powered by the ICE.

13. The ICE of claim 1, 8 or 11 in which the engine's air intake manifold includes a valve operable in response to the engine's performance to open and admit atmospheric air when the engine's requirements for oxygen cannot be met by oxygen passing through the one or more air separation devices.

* * * * *